June 1, 1943.    L. W. COOK    2,320,811
PROTECTIVE DEVICE
Filed July 3, 1942
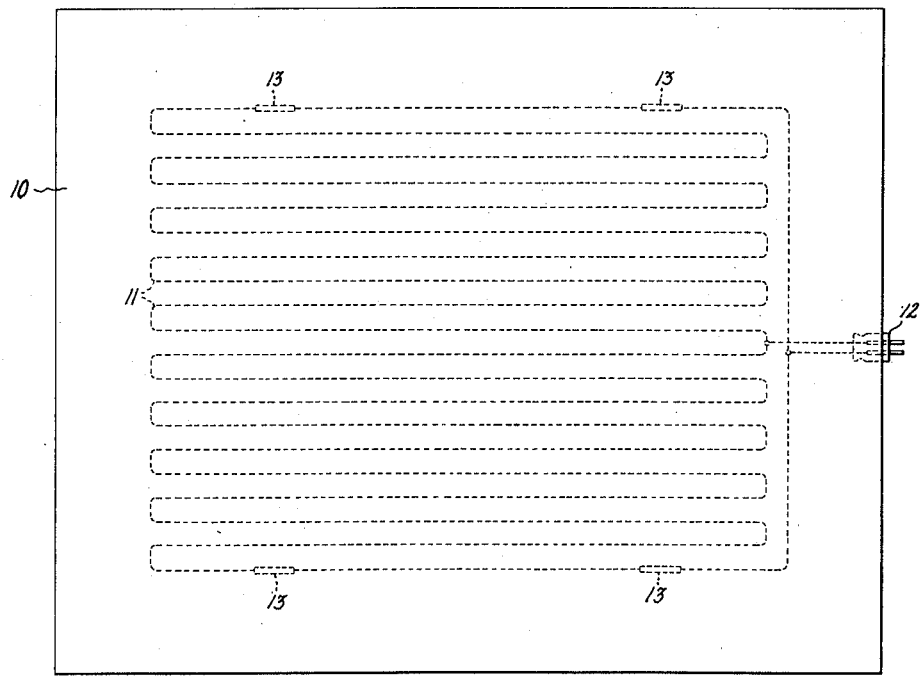
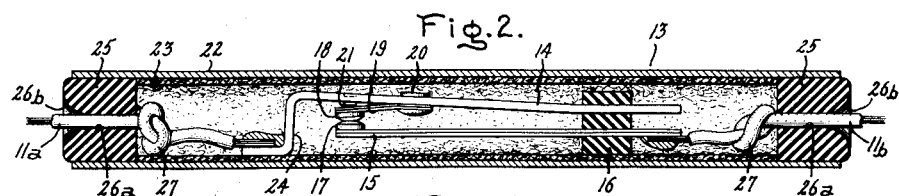
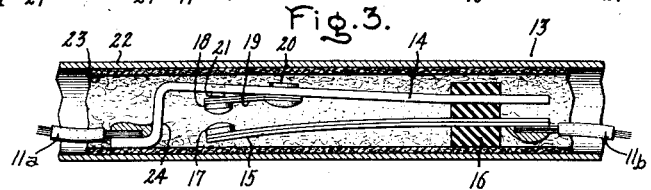
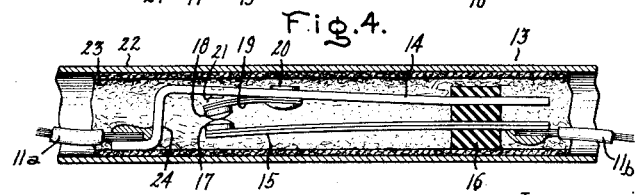
Inventor:
Leonard W. Cook,
by Harry E. Dunham
His Attorney.

Patented June 1, 1943

2,320,811

UNITED STATES PATENT OFFICE 2,320,811

PROTECTIVE DEVICE

Leonard W. Cook, Stratford, Conn., assignor to General Electric Company, a corporation of New York Application July 3, 1942, Serial No. 449,655

7 Claims. (Cl. 200—138)

The present invention relates to protective devices and more particularly to thermostatic protective devices adapted to control electric circuits in accordance with temperature changes.

While not limited thereto, the present invention has particular utility as a protective device for preventing overheating of flexible electric heaters such as electric blankets, electric heating pads and the like.

The conventional electric heated blanket or bed cover comprises a blanket having woven or stitched channels through which are threaded electric heating conductors. These conductors are energized from a suitable source of supply and generate sufficient heat to keep the blanket at some desired temperature under normal conditions of operation during which the blanket is spread out over the heated surface. It occasionally happens that during use the blanket becomes bunched or folded so that the heat lost from a section of the heating conductors is greatly reduced, and this tends to cause localized heating with the attendant possibility of fire. In order to preclude the possibility of such local overheating, it is common to incorporate into the blanket a number of protective thermostats which are suitably placed in different areas and connected so that overheating in any one of these areas causes the associated thermostat to operate to deenergize the blanket.

In order to permit washing of the blanket, the protective thermostat must be costructed so that it is unaffected by washing liquid and this is usually accomplished by providing the thermostat with a fluid-tight enclosing casing. Difficulty has been encountered in utilizing enclosed thermostats of conventional construction because of their failure to reclose once they have opened in response to local overheating. This action is caused by arcing of the thermostat contacts which generates sufficient heat within the relatively small enclosure to maintain the temperature at or above the operating temperature of the thermostat. Therefore, the contacts continue to flutter, causing the contacts to deteriorate rapidly and preventing proper operation of the blanket. In order to restore the thermostat to the normal closed position, it is usually necessary to disconnect the blanket and this, of course, is undesirable.

An object of the present invention is to provide an improved protective thermostat.

A more specific object of my invention is to provide a thermostatic switch of the slow make-and-break type having improved means for preventing continued arcing of the contacts.

The further object of my invention is to provide an improved and simplified safety thermostat for an electric blanket which is unaffected by immersion in a washing or other fluid.

A still further object of my invention is to provide an improved enclosed safety thermostat for an electric blanket, the operating temperature of which can be accurately set and which will maintain its setting during use.

Further objects and advantages of my invention will become apparent as the following description proceeds and the features of novelty which characterize my invention will be pointed out with particularity in the claims annexed to and forming part of this specification.

For a better understanding of my invention, reference may be had to the accompanying drawing in which Fig. 1 shows an electric blanket having protective thermostats constructed in accordance with my invention; Fig. 2 is a sectional view of the thermostat, and Figs. 3 and 4 are similar to Fig. 2, the thermostatic mechanism being shown in different operative positions.

Referring to the drawing, I have shown a conventional electric blanket or bed cover 10 having enclosed therein suitable electric heating conductors 11 which may be connected, as shown, to form two parallel circuits. The blanket has a suitable attachment plug 12 by means of which the conductors 11 may be connected to a suitable source of current supply.

For the purpose of preventing local overheating in case the blanket should become folded or bunched while connected to the power supply, I provide suitable protective thermostats 13 which are connected in series with the looped heating conductors 11 and which are placed within the blanket in heat conducting relation therewith so as to operate in response to an over temperature to disconnect the associated portion of the heating circuit. While I have shown the blanket as being provided with four protective thermostats, it will be understood that any number may be used depending on the degree of protection desired. It will also be understood that the heating conductors 11 may be connected in series or in a number of parallel circuits depending upon the number of separately controlled circuits that is desired.

Referring to Fig. 2 of the drawing, the safety thermostat comprises a metal contact arm 14 and a main bimetallic strip 15 which extend in parallel spaced relation and which are anchored in a block of suitable molded insulating material 16. The main bimetallic strip 15 carries, at its free end, a contact 17 which cooperates with a contact 18 mounted on one end of an auxiliary bimetallic strip 19, the opposite end of which is secured to the contact arm 14 by means of a rivet 20. The main and auxiliary bimetallic strips 15 and 19 are arranged so that they both tend to deflect downwardly when heated. The auxiliary strip 19 is shorter and has a smaller cross-sectional area than the main strip 15 whereby it has a smaller thermal mass and heats more rapidly than the main strip for a purpose which will be explained below.

Extending downwardly from the contact arm 14 is a current conducting projection 21 which may be formed, as shown, by indenting the opposite side of the contact arm. The projection 21 engages the auxiliary bimetallic strip 19 so that it is forced outwardly away from the contact arm 14 against the bias caused by its own resilience. The auxiliary bimetallic strip 19 is thus mechanically stressed by the projection 21 and the stressing is such that the free end of the auxiliary strip remains in contact with the projection 21 until a temperature is reached which is above the temperature at which the contacts 17 and 18 are opened by a deflection of the main bimetallic element 15.

Suitable flexible electrical conductors 11a and 11b are secured respectively to the contact arm 14 and to the fixed end of the main bimetallic strip 15 in any suitable manner, as by soldering. It will be understood that the ends of the conductors 11a and 11b are connected in a series circuit relation with the heating conductors 11 of the electric blanket.

In order to protect the thermostat from liquid, such as would be encountered when the blanket is washed or when the user perspires, the thermostat is provided with a fluid-tight enclosing casing. The casing comprises a tube 22, preferably formed of a good heat conducting material, such as copper. The thermostat assembly comprising the contact arm 14, the main bimetallic strip 15, the anchoring block 16, the cooperating contacts 17 and 18, and the auxiliary bimetallic strip 19 is so dimensioned relative to the tube 22 that it is free to "float" or ride about inside of the tube. The tube 22 has an inner-liner of some suitable insulating material 23, such as asbestos, in order to electrically insulate the tube from the thermostat assembly. It will be noted that one end of the contact arm is provided with an offset portion 24 which cooperates with the anchoring block 16 in maintaining the bimetallic strips 15 and 19 in spaced relation with the inner walls of the tube. Because of the loose mounting arrangement, any reasonable distortion of the tube, such as would be caused by the weight of a person lying on the blanket, does not stress the contact supports and thereby affect the temperature setting of the thermostat.

The ends of the tube 22 are closed by means of plugs 25 which are formed of some suitable resilient material, such as rubber, so that they may be inserted into the ends of the tube. Each end plug is provided with an axially extending opening having an inner straight portion 26a and an outer convexly curved portion 26b. The straight portion of the opening 26a is somewhat smaller than the diameter of the conductors 11a and 11b so that the conductors have to be forced through the opening. After the ends have been forced through the tube, the force fit between the conductors and the plugs effectively seals the unit against moisture. The outer curved portion 26b limits the radius of curvature of the conductors at the point of emergence from the tube and thereby reduces the possibility of breakage at the bending point.

In order to prevent tensile forces applied to the flexible conductors 11a and 11b from being transmitted to the thermostat assembly, the flexible conductors are knotted on the inside of the tube, as indicated at 27, to provide strain relief means. When tensile forces are applied to the conductors 11a and 11b, the knots pull against the centers of the plugs and tend to expand the plugs in the tubes whereby the conductors and plugs are held firmly in place. It will be understood that instead of knotting the conductors, suitable restraining means could be secured thereto without departing from my invention.

During normal operation of the blanket the protective thermostats 13 are in the closed circuit position and current flows through each thermostat in a path defined as follows: the flexible conductor 11a, the metal current-conducting contact arm 14, the current-conducting projection 21, the contacts 17 and 18, the main bimetallic strip 15 and the flexible conductor 11b. As pointed out before, the conductors 11a and 11b are connected in series circuit relation with the portion of the heating circuit with which the particular thermostat is associated. During this time the auxiliary bimetallic strip 19 is in contact with the projection 21 so that the flow of heating current does not traverse the auxiliary strip. The cross-sectional area of the main strip 15 is sufficiently large that the flow of current therethrough does not cause any appreciable heating therein.

If for some reason, such as a bunching or a folding of the blanket, a portion of the blanket locally overheats and exceeds the predetermined temperature at which the thermostat is set to operate, the increase in temperature is quickly transmitted through the tube 22 to the main bimetallic strip 15. The strip 15 then deflects or warps downwardly, as shown in Fig. 3, causing the contact 17 to move away from the contact 18 and thereby open the circuit. The auxiliary strip 19 remains in contact with the projection 21, as shown.

As a result of the opening of the protective thermostat, the overheated portion of the blanket begins to cool down so that the main bimetallic strip deflects upwardly towards its initial position, bringing the contact 17 into contact with the contact 18. Due to the inherent operating characteristic of the main bimetallic strip 15, the movement of the contact 17 mounted on its free end is relatively slow and for that reason this type of thermostat is known as the slow make-and-break type. When the contact 17 first lightly touches the contact 18, an arc is likely to form because the current flowing in the heating circuit of the blanket is relatively large and the contact area is small. This arcing, if permitted to continue, will heat up the interior of the enclosing casing so that the main bimetallic strip 15 tends to deflect downwardly again, intermittently opening the heating circuit.

According to the present invention, such continued arcing is prevented by the action of the auxiliary bimetallic strip 19. When the arcing first commences, upon a reclosure of the contacts 17 and 18, the strip 19 becomes heated more rapidly than the main bimetallic strip 15 since it has a smaller thermal mass. Therefore, the auxiliary strip 19 quickly deflects downwardly so that the contacts 17 and 18 are firmly forced together so as to preclude further arcing. This condition of operation is shown in Fig. 4 of the drawing. It will be noted that in this position the free end of the auxiliary strip 19 has moved away from the current conducting projection 21 and as a result the heating current flows from the contact arm 14 to the contact 18 through the body of the auxiliary strip 19. The flow of heating current through the auxiliary strip causes it to become heated still more so that the contact pressure is maintained even though the arcing is stopped. As the overheated portion of the blanket continues to cool down, the main strip 15 continues to cool and become stressed upwardly. Because the main strip 15 is much larger than the auxiliary strip 19, the force developed thereby soon overcomes the opposing force developed by the auxiliary strip so that the contacts are forced back to the initial position shown in Fig. 2 of the drawing. In this position the current flowing through the contacts 17 and 18 again traverses the current-conducting projection 21 which shunts the current path through the body of the auxiliary strip 19 so that there is no longer any appreciable localized heating therein. Thereafter, the blanket continues to heat in the normal manner.

Due to the action of the auxiliary bimetallic strip 19 in preventing continued arcing upon a reclosing of the thermostat contacts, the thermostat operates consistently and has a relatively low differential of operation, that is, there is a relatively small difference between the temperatures corresponding to the opening and closing of the thermostat. Hence the thermostat may be safely set to operate at a temperature not far above the normal operating temperature of the blanket with assurance that after the thermostat has opened in response to a local overheating, the thermostat will reclose without the necessity of cooling the blanket below its normal operating temperature. Therefore, a maximum protection is afforded and a continuous operation of the blanket is assured.

It is to be particularly noted that with my improved construction, the auxiliary bimetallic strip 19 has no effect whatsoever upon the opening temperature of the thermostat due to the fact that the free end carrying the contact 18 remains pressed against the projection 21 until it is heated to a temperature greater than that which causes the main bimetallic strip 15 to deflect and open the thermostat contacts. Therefore, the opening temperature of the thermostat can be accurately predetermined and set since it is unaffected by any movement of the auxiliary strip 19 whereby a very accurate setting of the thermostat is possible.

As described above my improved thermostat has the additional advantage that it is fluid-tight so that the blanket can be washed if desired. Also tensile forces, which are apt to be applied to the conductors 11a and 11b during normal use of the blanket, cannot be transmitted to the thermostat mechanism so as to stress the contact supports and thereby change the setting at which the thermostat operates. Furthermore, because of the free mounting arrangement of the thermostat assembly, distortion of the enclosing tube by application of mechanical pressure thereto also does not affect the setting of the thermostat. Therefore, it will be evident that I have provided a safety thermostat which accurately maintains its temperature setting and, therefore, gives a maximum protection under a variety of conditions of operation which are particularly troublesome where a flexible electric heater, such as an electric blanket or bed cover, is to be protected.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A thermostat comprising a main bimetallic strip, a contact arm, means for supporting said strip and said arm in spaced relation, an auxiliary bimetallic strip having one end secured to said arm and having mounted on its opposite end an electrical contact, a cooperating electrical contact mounted on said main bimetallic strip, said main and auxiliary strips being arranged to deflect in the same direction when heated, a current conducting projection extending from said contact arm beneath the free end of said auxiliary strip and acting to stress said auxiliary strip so that it does not deflect at a temperature below a predetermined value at which said main strip deflects to open said contacts, said projection acting also normally to shunt current flowing through said contacts around said auxiliary strip, said auxiliary strip acting to deflect away from said projection and force said contacts together when heated above said predetermined temperature value by arcing between said contacts so that said current then flows through and heats said auxiliary strip whereby said contacts are maintained in engagement.

2. A thermostat comprising a main bimetallic strip, a support in spaced relation with said strip, an auxiliary bimetallic strip mounted on said support and carrying an electrical contact, a cooperating electrical contact mounted on said main bimetallic strip, means for normally shunting said auxiliary strip when said contacts are closed, and when said contacts have been opened by said main bimetallic strip and reengaged responsive to the closing movement of said bimetallic strip, said auxiliary bimetallic strip deflecting to force said contacts together by the heat generated in the arcing between said contacts, and said shunting means then being rendered ineffective by said auxiliary bimetallic strip so that current flows through it and heats it to maintain said contacts in engagement.

3. A thermostat comprising a current conducting arm, a current conducting main bimetallic element spaced from said arm, an auxiliary current conducting bimetallic element in the space between said arm and said main bimetallic element having one end secured to said arm and carrying on its other end an electrical contact, a cooperating electrical contact on said main bimetallic element, said cooperating contacts when closed completing a circuit which includes said arm and main bimetallic element, means in said circuit for excluding the major portion of the length of said auxiliary bimetallic element when said contacts are closed, said main and auxiliary bimetallic elements being arranged to deflect in the same direction when heated and said main bimetallic element when heated to a predetermined temperature operating to open said contacts, said auxiliary bimetallic element being heated when said contacts reengage responsively to the cooling of said main bimetallic element by the arcing between them so as to deflect to force said contacts together, and also to include itself in said electrical circuit so that current flows through its length and heats it to maintain said contacts in engagement.

4. A thermostat comprising walls defining a housing, an assembly comprising a thermostatic switch mounted within said housing, flexible electrical conductors connected to said switch and extending through said walls to the outside of said housing, means securing the portions of said conductors that pass through said walls to them, said assembly being secured to said walls only through said flexible conductors, and the lengths of said flexible conductors within said housing providing for relative movement between the housing and the assembly so that distortion of the housing within certain limits will not strain the conductors and thereby affect the temperature setting of the switch.

5. A fluid-tight thermostatic protective device comprising a tube formed of heat conducting material, an assembly comprising a thermostatic switch mounted within said tube, resilient plugs inserted into the ends of said tube so as to enclose said assembly, said plugs having apertures therein, a pair of flexible electrical conductors connected to said switch and extending out opposite ends of the tube through the apertures of said plugs, strain relief means within said housing to prevent the pulling of said conductors from said plugs, said flexible conductors constituting the sole means attaching said assembly to said tube and the lengths of the portions thereof within said tube providing for relative movement between the assembly and the tube.

6. A thermostat controlling an electric circuit responsively to ambient temperature changes comprising a current conducting main thermostat, a current conducting switch arm, a current conducting auxiliary thermostat on said switch arm, cooperating contacts on said main and auxiliary thermostats for electrically connecting said main thermostat and said switch arm in order to control said circuit, said main and auxiliary thermostats being arranged to deflect in the same direction when heated and said main thermostat being arranged to deflect to open said contacts at a predetermined high ambient temperature, means for stressing said auxiliary thermostat so that it deflects only upon being heated to a temperature above said predetermined high temperature and for substantially shunting it out of the circuit including said switch arm and said main thermostat when said contacts are closed, said auxiliary thermostat operating when said contacts are reclosed following the opening thereof by said main thermostat and is heated to a temperature above said predetermined temperature by the arcing between said contacts to move toward said main thermostat and hold said contacts together, said last-named means then operating to include said auxiliary thermostat in said circuit of said switch arm and main thermostat so that current flows through it and heats it to hold said contacts in engagement.

7. A thermostat comprising a main bimetallic strip, a contact arm, means for supporting said strip and said arm in spaced relation, an auxiliary bimetallic strip having one end secured to said arm and having mounted on its opposite end an electrical contact, a cooperating electrical contact mounted on said main bimetallic strip, said main and auxiliary strips being arranged to deflect in the same direction when heated, a current conducting projection extending from said contact arm beneath the free end of said auxiliary strip acting normally to shunt current flowing through said contacts around said auxiliary strip, said auxiliary strip acting to deflect away from said projection and force said contacts together when heated above said predetermined temperature value by arcing between said contacts so that said current then flows through and heats said auxiliary strip whereby said contacts are maintained in engagement.

LEONARD W. COOK.